United States Patent
Scheibe et al.

[15] 3,700,350
[45] Oct. 24, 1972

[54] HELICOPTER CYCLIC AND COLLECTIVE PITCH MECHANISM

[72] Inventors: Harold R. Scheibe, King George; John E. Blankenship, Fredericksburg, both of Va.

[73] Assignee: The United States of America as represented by the Secretary of the Navy

[22] Filed: Feb. 3, 1971

[21] Appl. No.: 112,161

[52] U.S. Cl. .................................. 416/114, 416/160
[51] Int. Cl. ........................................ B64c 27/74
[58] Field of Search ............. 416/18, 24, 98, 114, 160

[56] References Cited

UNITED STATES PATENTS

| | | | |
|---|---|---|---|
| 2,491,260 | 12/1949 | Green | 416/98 |
| 2,519,762 | 8/1950 | Hoffmann et al. | 416/18 |
| 2,520,268 | 8/1950 | Avery | 416/240 X |
| 2,648,387 | 8/1953 | Doman | 416/160 X |
| 2,818,123 | 12/1957 | Hiller | 416/24 |
| 2,827,968 | 3/1958 | Sissingh et al. | 416/18 |
| 3,027,948 | 4/1962 | Goland et al. | 416/18 |
| 3,232,348 | 1/1966 | Jarosch | 416/114 X |
| 3,536,415 | 10/1970 | Kusiak | 416/160 |
| 3,572,965 | 3/1971 | Scheibe | 416/18 |

*Primary Examiner*—Everette A. Powell, Jr.
*Attorney*—R. S. Sciascia and Thomas O. Watson, Jr.

[57] ABSTRACT

An apparatus for changing both the cyclic and collective pitch of each blade of a rigid rotor helicopter with a single differential gear mechanism. To change the collective pitch, a spider element is moved up or down which simultaneously actuates the differential gear mechanism for each blade in order to change its pitch collectively To change the cyclic pitch, a seesaw type linkage is actuated and applies a torque to the swash plate and control gyro of the helicopter. The control gyro supports lateral arms and the applied torque changes their plane of rotation. Linkages connected between each of the control arms and differential gear mechanisms react to this change in the plane of rotation and actuate the appropriate differential gear mechanisms to cyclically change the pitch of the blades.

5 Claims, 2 Drawing Figures

PATENTED OCT 24 1972

INVENTORS
HAROLD R. SCHEIBE, JR.
JOHN E. BLANKENSHIP

BY Thomas O. Watson Jr.

ATTORNEY

HELICOPTER CYCLIC AND COLLECTIVE PITCH MECHANISM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in rigid rotor helicopters, and more particularly it pertains to new and improved rotor control means wherein a single differential gear mechanism changes both the cyclic and collective pitch of a blade of a rigid rotor helicopter.

In the field of helicopter rotor controls, it has been the general practice to obtain cyclic pitch of the rotor blades by connecting a horizontal link to the leading edge of a rotor blade and extending a vertical or inclined link downwardly from a control gyro arm to the horizontal link. In operation, when the gyro is tilted down toward a rotor blade, it decreases the blade angle of attack and vice versa. This system, though simple, has been unsatisfactory in that it provides only limited ratios between the control gyro tilt angle and the change in the blade angle of attack. In the prior art, it has also been the general practice to obtain collective pitch by changing the distance between the plane of the rotor blades and the control gyro hub, usually by moving the control gyro until the desired change in angle of attack has been brought about. However, this system has also been unsatisfactory in that it requires overcoming the mass of the control gyro and it also requires the use of a spline attached to the blade hub which can slide through the gyro hub. Both of these conditions require a large control system to assure adequate response and to overcome friction.

OBJECTS OF THE INVENTION

Accordingly, it is an object of the present invention to provide an apparatus for introducing both cyclic and collective pitch to a rotor blade from the control gyro platform through the use of a single differential gear mechanism.

Another object of the invention is to provide a system whereby virtually any linkage ratio can be achieved.

A further object of the invention is to eliminate the need for moving the massive control gyro and the need for a working spline.

Other objects, advantages and novel features of the invention will become apparent from the following detailed description of the invention when considered in conjunction with the accompanying drawings.

SUMMARY OF THE INVENTION

The general purpose of this invention is to provide a single differential gear mechanism for each rotor blade that will achieve both cyclic and collective pitch in that blade of the rigid rotor helicopter. To change the collective pitch, a motor-driven shaft moves a spider element up or down to simultaneously actuate the differential gear mechanism for each blade in order to change their pitch collectively. To change the cyclic pitch, a seesaw-type linkage is actuated and applies a torque to the swash plate and control gyro of the helicopter. The control gyro supports lateral arms and the applied torque changes their plane of rotation. Through linkages connected to each of the lateral control arms, the differential gear mechanism of the appropriate blades are actuated to cyclically change the pitch of the blades. In this manner, the present invention provides a device which avoids the problem of moving the control gyro to change the pitch of the rotor blades.

DETAILED DESCRIPTION OF THE PREFERRED EMBODIMENT

Figure 1:
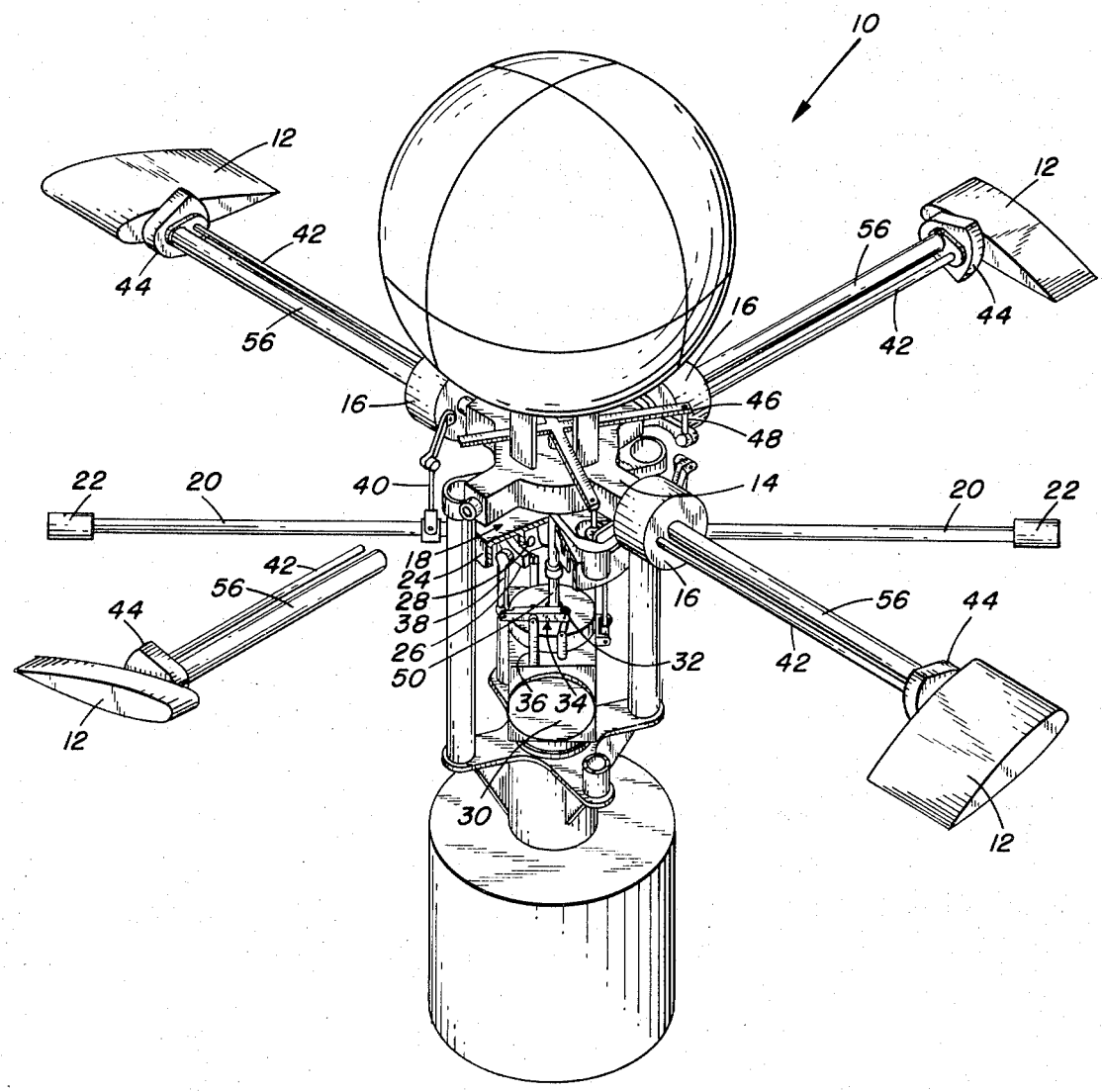
FIG. 1 shows a typical helicopter rotor control gyro assembly with portions thereof cut away.

FIG. 1 shows a helicopter rotor system 10 of the rigid rotor type wherein four rotor blades 12 are connected to a rotor blade hub 14 through four housings 16. Each of the housings 16 contains the differential gear mechanism of the present invention which may also be referred to as the cyclic and collective pitch control mechanism for changing rotor blade pitch.

A control gyro assembly 18 comprises four radially extending cross arms 20 (only two shown), each having end weights 22, supported by a control gyro hub 24. Control gyro hub 24 includes a swash plate 26 and a constant velocity universal joint 28. Joint 28 is of the type known commercially as the Rzeppa Constant Velocity Universal Joint, which is manufactured by the Dana Corporation of Detroit, Michigan. Two torque motors (not shown), are provided in a housing 30 and are connected to swash plate 26, so that upon actuation, one of the motors applies a torque to process the control gyro 18 in a north-south direction and the other in an east-west direction. This structure and/or operation is described with greater particularity in a co-pending application, Ser. No. 818,625, in the name of Harold R. Scheibe, filed Apr. 23, 1969 now U.S. Pat. No. 3,572,965, and assigned to the assignee of the present application. Mounted on the rotor of each of the torque motors is a rack and pinion arrangement to actuate one end 32 of a seesaw linkage 34 which is supported at its middle by pivot support 36. At its other end, is a rod 38 which is connected to swash plate 26. Upon actuation of one of the torque motors, a torque is applied to the swash plate 26 and control gyro 18 through the rack and pinion and linkage arrangement. An identical arrangement (not shown) associated with the other torque motor is provided at the other side of housing 30 and serves to precess the control gyro 18 in a direction orthogonal to the direction of precession caused by the first torque motor. The point of application of force to the swash plate 26 by this other torque motor is 90° displaced from the point of application of force by the first torque motor. The control gyro arms 20, which precess with the control gyro 18, are each slaved to the helicopter rotor blades 12 by a linkage 40 and a shaft 42 via the differential gear mechanism in each housing 16 and a gear reduction system in each housing 44 which provides the proper actuating ratios for each of the blades 12 to achieve cyclic pitch. Collective pitch is changed by raising or lowering, with respect to blade hub 14, a lightweight spider 46, having four fingers, each of which is connected by a vertical link 48 to the differential gear mechanism in each of the housings 16. Spider element 46 is connected to a center shaft 50 which is actuated by a third motor (not shown) in housing 30.

Figure 2:
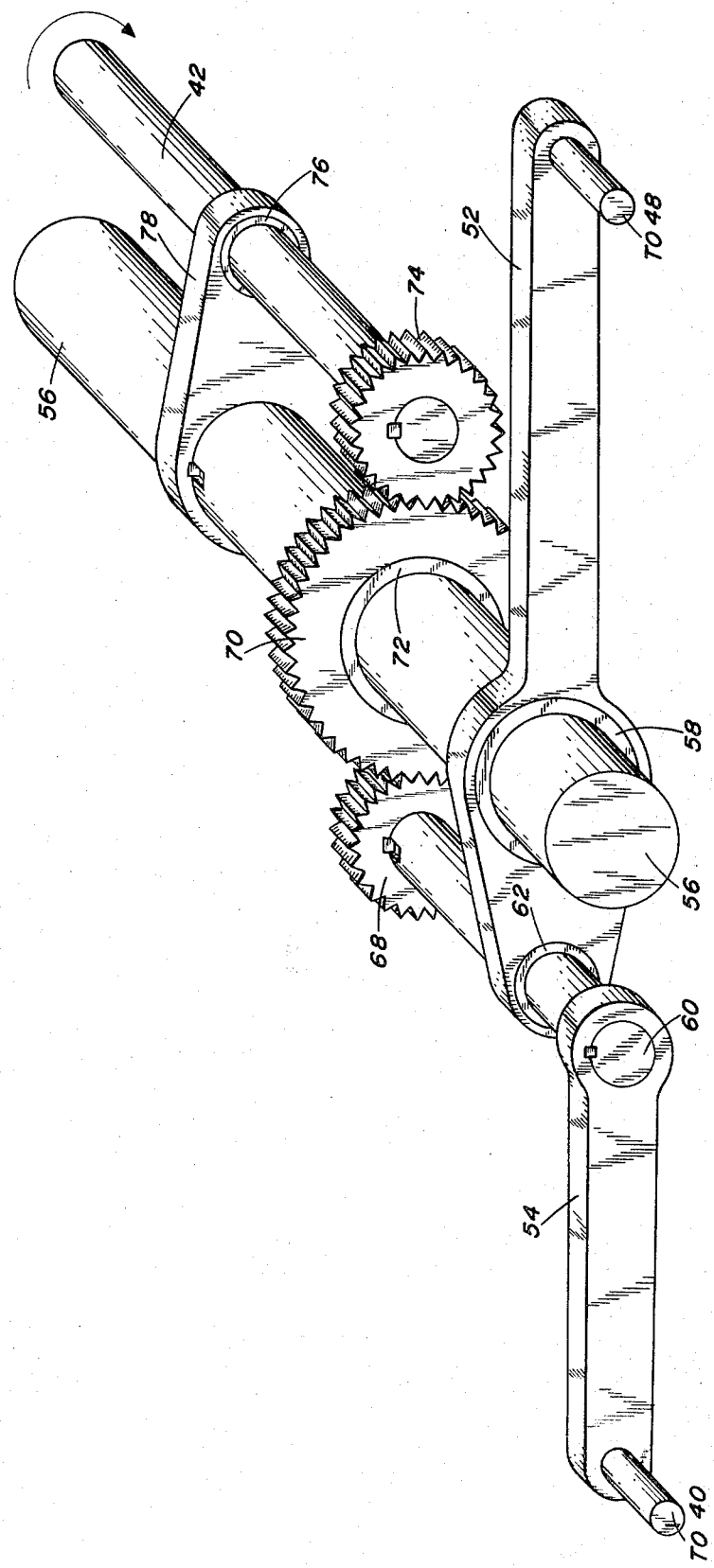
FIG. 2 is a detailed perspective view of the differential gear mechanism of the present invention.

FIG. 2 shows in detail the differential gear mechanism or cyclic and collective pitch control mechanism of the present invention which is located in each of the housings 16. Each mechanism includes a collective pitch control link 52, each of which is connected to a different one of the vertical links 48 and a cyclic pitch control link 54, each of which is connected to a different one of the linkages 40.

A description of the differential gear mechanism of FIG. 2 will now be given and it will be applicable to each of the four differential gear mechanisms in the preferred embodiment of FIG. 1, as they are all identical in structure. Collective pitch control link 52 pivots about a non-rotatable blade shaft 56 on a bearing 58. A shaft 60, which is keyed to cyclic pitch control link 54, rotates in a bearing 62 which is also mounted within link 52. Shaft 60 is also keyed to a gear 68 to cause it to rotate therewith. Gear 68 engages another gear 70 and causes it to rotate about the non-rotatable blade shaft 56 on a bearing 72. As gear 70 rotates, it drives a gear 74 which is keyed to the rotatable shaft 42. Shaft 42, which rotates in a bearing 76, is rigidly aligned with the non-rotating blade shaft 56 by a link 78 which is keyed to shaft 56. Rotatable shaft 42 is connected to housing 44 (see FIG. 1) which contains a suitable reduction gear mechanism to actuate rotor blades 12.

In operation, collective pitch control is obtained by actuating the motor-driven center shaft 50 to raise or lower lightweight spider 46 and its four fingers with respect to blade hub 14. This movement of spider 46 will cause each of the vertical links 48 to actuate the collective pitch control links 52 within each of the differential gear housings 16. Assume, for explanatory purposes, that the operation of the differential gear mechanism shown in FIG. 2 is representative. If link 52 is moved upward in the direction of the arrow shown in FIG. 2, it will pivot about non-rotatable blade shaft 56, due to bearing 58. To vary the collective pitch, cyclic pitch control link 54 is held fixed by linkage 40. The other end of link 54 will then be free to move in a downward direction as link 52 pivots abut shaft 56. This downward movement of link 54 will cause keyed shaft 60 to rotate in bearing 62 and force keyed gear 68 to rotate therewith. As gear 68 is actuated, it will rotate meshed gears 70 and 74, thereby causing keyed shaft 42 to rotate in a clockwise direction. Rotation of shaft 42 causes rotor blades 12 to change pitch collectively through a suitable reduction gear mechanism in housing 44. In this manner, the angle of attack of blades 12 is increased which results in increased helicopter lift. To decrease lift, collective pitch control link 52 is moved in a downward direction.

Cyclic pitch control is obtained by actuating one of the two seesaw linkages 34, depending on whether precession in a north-south direction or an east-west direction is desired. Upon actuation, a rod 38 applies a torque to the swash plate 26 and control gyro 18 through the rack and pinion and linkage arrangement described above. As the control gyro 18 supports gyro arms 20, the applied torque changes the parallel relationship between the planes in which rotor blades 12 and control gyro arms 20 rotate in. This change in the parallel relationship of the planes will actuate linkages 40 which are connected to the cyclic pitch control links 54 of the differential gear mechanisms, as represented in FIG. 2. To vary the cyclic pitch, collective pitch control link 52 is held fixed by spider 46 and vertical link 48, as cyclic pitch control 54 is actuated by linkage 40. Link 54 may be actuated up or down to pivot about the axis of shaft 60. If link 54 is actuated upwardly, keyed shaft 60 will rotate in a clockwise direction and keyed gear 68 will rotate therewith. As gear 68 is actuated, it will rotate meshed gears 70 and 74, thereby causing keyed shaft 42 to rotate in a clockwise direction. Rotation of shaft 42 causes rotor blades 12 to change pitch cyclically through the reduction gear mechanism in housing 44. The force input to the blades 12 and the difference in aerodynamic lift moments produced between the advancing and retreating blades causes the rotor plane to precess in the desired direction, which results in movement of the helicopter in the desired direction.

To obtain cyclic pitch, the differential gear mechanism operates in the same manner as described to obtain collective pitch. The only difference is that for collective pitch, each of the four differential gear mechanisms are actuated the same amount to increase or decrease helicopter lift, whereas for cyclic pitch each of the four differential gear mechanisms may be actuated in different amounts in order to cause the helicopter to move in the desired lateral direction or in a forward or reverse direction.

Accordingly, it is seen how this invention provides a single differential gear mechanism to achieve both collective and cyclic pitch motions in each blade of a rigid rotor helicopter. In so doing, it offers a simple technique for varying the linkage ratios between the control gyro angle and the angle of attack of the blades and it eliminates the requirement of vertical movement of the control gyro with respect to the blade axis. It is to be noted, that by varying the lengths of pivot points and gear diameters, virtually any linkage ratio can be achieved. Further, the invention not only eliminates the need for moving the massive control gyro, but also eliminates the need for a working spline. Alternative arrangements of gears and ratios may be considered to be simple variations of the present invention.

Obviously many modifications and variations of the present invention are possible in the light of the above teachings.

What is claimed is:

1. An apparatus for varying both the collective and cyclic pitch in the blades of a rigid rotor helicopter with a single differential gear mechanism comprising,
   a plurality of rotor blades;
   an equal plurality of differential gear mechanisms;
   each of said differential gear mechanisms including a collective pitch control link having first and second bearings therein;
   a non-rotatable blade shaft having one end mounted in the first bearing and its other end connected to a gear reduction means cooperating with a rotor blade;

a second shaft mounted in the second bearing having one end keyed to a cyclic pitch control link and its other end keyed to a first gear;

a second gear rotatably mounted on said blade shaft and engaging said first gear;

a third link having a third bearing therein, said third link being keyed to said blade shaft between said second gear and said gear reduction means;

a rotatable shaft mounted in said third bearing having one end keyed to a third gear, said third gear engaging said second gear, the other end of said rotatable shaft being connected to said gear reduction means;

first means to actuate said collective pitch control link in each of said differential gear mechanisms an equal amount to cause the first, second and third gears to interact, actuating said gear reduction means to vary the pitch of said rotor blades collectively; and second means to actuate said cyclic pitch control link in each of said differential gear mechanisms a different amount to cause the first, second and third gears to interact, actuating said gear reduction means to cyclically vary the pitch of said rotor blades.

2. The apparatus of claim 1 wherein said first means comprises a motor-driven center shaft connected to a spider having a plurality of fingers equal in number to the plurality of rotor blades, each of said fingers having a vertical link thereon cooperating with a collective pitch control link whereby vertical movement of said center shaft will displace said spider and the respective vertical links to simultaneously move the collective pitch control link in each of said differential gear mechanisms an equal amount.

3. The apparatus of claim 2 wherein said second means comprises a plurality of motor-driven seesaw linkage means for applying a predetermined torque to a swash plate and control gyro means which cooperates with the cyclic pitch control link in each of said differential gear mechanisms.

4. The apparatus of claim 1 wherein said second means comprises a plurality of motor-driven seesaw linkage means for applying a predetermined torque to a swash plate and control gyro means which cooperates with the cyclic pitch control link in each of said differential gear mechanisms.

5. The apparatus of claim 4 wherein said control gyro means includes a plurality of gyro control arms and means for connecting each of said control arms to a different one of said differential gear mechanisms.

* * * * *